United States Patent
Lewis et al.

(10) Patent No.: US 11,470,406 B2
(45) Date of Patent: Oct. 11, 2022

(54) METHODS, SYSTEMS, AND MEDIA FOR PROVIDING PERSONALIZED NOTIFICATIONS TO VIDEO VIEWERS

(71) Applicant: Google LLC, Mountain View, CA (US)

(72) Inventors: Justin Lewis, South San Fracisco, CA (US); Gavin James, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 61 days.

(21) Appl. No.: 16/983,069

(22) Filed: Aug. 3, 2020

(65) Prior Publication Data

US 2020/0366966 A1    Nov. 19, 2020

Related U.S. Application Data

(63) Continuation of application No. 15/012,035, filed on Feb. 1, 2016, now Pat. No. 10,735,821, which is a
(Continued)

(51) Int. Cl.
*H04N 21/8545*    (2011.01)
*H04N 21/258*    (2011.01)
(Continued)

(52) U.S. Cl.
CPC ......... *H04N 21/8545* (2013.01); *H04N 5/445* (2013.01); *H04N 21/25891* (2013.01); *H04N 21/431* (2013.01); *H04N 21/435* (2013.01); *H04N 21/4755* (2013.01); *H04N 21/4758* (2013.01); *H04N 21/4786* (2013.01); *H04N 21/4788* (2013.01); *H04N 21/4882* (2013.01);
(Continued)

(58) Field of Classification Search
CPC ............ H04N 21/4882; H04N 21/431; H04N 21/4755; H04N 21/4758; H04N 21/858
See application file for complete search history.

(56) References Cited

U.S. PATENT DOCUMENTS 6,631,523 B1    10/2003    Matthews et al.
6,792,618 B1 *    9/2004    Bendinelli ....... H04N 21/47202
                                            348/E7.071
(Continued)

OTHER PUBLICATIONS

Notice of Allowance dated Feb. 21, 2019 in U.S. Appl. No. 15/012,035.
(Continued)

*Primary Examiner* — Olugbenga O Idowu
(74) *Attorney, Agent, or Firm* — Byrne Poh LLP

(57) ABSTRACT

Methods, systems, and media for providing personalized notifications to video viewers are provided. In some embodiments, the method comprises: receiving, using a hardware processor, one or more prompts to be presented in association with a video from a user account associated with the video; receiving, from the user account associated with the video, one or more notifications, wherein each of the one or more prompts is associated with one of the one or more notifications; causing the one or more prompts to be presented in association with presentation of the video to a user; receiving an indication that a first prompt of the one or more of the prompts was selected by the user; causing a notification associated with the first prompt to be presented to the user in response to receiving the indication.

18 Claims, 7 Drawing Sheets

Related U.S. Application Data continuation of application No. 14/486,605, filed on Sep. 15, 2014, now Pat. No. 9,253,551.

(51) Int. Cl.
  *H04N 21/475* (2011.01)
  *H04N 21/4786* (2011.01)
  *H04N 5/445* (2011.01)
  *H04N 21/4788* (2011.01)
  *H04N 21/435* (2011.01)
  *H04N 21/61* (2011.01)
  *H04N 21/858* (2011.01)
  *H04N 21/431* (2011.01)
  *H04N 21/488* (2011.01)

(52) U.S. Cl.
  CPC ..... *H04N 21/6125* (2013.01); *H04N 21/6175* (2013.01); *H04N 21/858* (2013.01); *H04N 21/8586* (2013.01)

(56) References Cited

U.S. PATENT DOCUMENTS

| | | |
|---|---|---|
| 9,113,214 B2 | 8/2015 | Andrews et al. |
| 2005/0102696 A1 | 5/2005 | Westberg |
| 2008/0034392 A1 | 2/2008 | McCarthy et al. |
| 2008/0092164 A1 | 4/2008 | Agarwal et al. |
| 2010/0031162 A1 | 2/2010 | Wiser et al. |
| 2012/0246246 A1* | 9/2012 | Moore ............... H04N 21/4882 709/206 |
| 2012/0324493 A1 | 12/2012 | Holmdahl et al. |
| 2014/0068432 A1 | 3/2014 | Kucharz et al. |
| 2015/0382061 A1 | 12/2015 | Maisenbacher et al. |

OTHER PUBLICATIONS

Notice of Allowance dated Apr. 2, 2020 in U.S. Appl. No. 15/012,035.
Notice of Allowance dated Sep. 18, 2015 in U.S. Appl. No. 14/486,605.
Office Action dated Feb. 15, 2017 in U.S. Appl. No. 15/012,035.
Office Action dated Mar. 19, 2018 in U.S. Appl. No. 15/012,035.
Office Action dated Apr. 23, 2015 in U.S. Appl. No. 14/486,605.
Office Action dated Jun. 22, 2017 in U.S. Appl. No. 15/012,035.
Office Action dated Sep. 9, 2016 in U.S. Appl. No. 15/012,035.
Office Action dated Sep. 17, 2018 in U.S. Appl. No. 15/012,035.
Office Action dated Oct. 18, 2019 in U.S. Appl. No. 15/012,035.
Office Action dated Oct. 31, 2019 in U.S. Appl. No. 15/012,035.
Office Action dated Nov. 16, 2017 in U.S. Appl. No. 15/012,035.

* cited by examiner

METHODS, SYSTEMS, AND MEDIA FOR PROVIDING PERSONALIZED NOTIFICATIONS TO VIDEO VIEWERS

CROSS-REFERENCE TO RELATED APPLICATIONS

This application is a continuation of U.S. patent application Ser. No. 15/052,035, filed Feb. 1, 2016, which is a continuation of U.S. patent application Ser. No. 14/486,605, filed Sep. 15, 2014, each of which is hereby incorporated by reference herein in its entirety.

TECHNICAL FIELD

The disclosed subject matter relates to methods, systems, and media for providing personalized notifications to video viewers.

BACKGROUND

Content creators often create, upload and/or post video content to online media content platforms. Some online media content platforms allow video viewers to interact with video content and/or content creators. For example, video viewers can comment on video content, share video content (e.g., by posting links to the video content on a social networking site), and/or subscribe to video content from a particular content creator (e.g., by subscribing to a feed associated with the video content and/or the content creator, by subscribing to a channel associated with the video content and/or the content creator, etc.). However, it can be difficult for content creators to interact with video viewers to encourage those video viewers to view additional content.

Accordingly, it is desirable to provide new methods, systems, and media for providing personalized notifications to video viewers.

SUMMARY

In accordance with various embodiments of the disclosed subject matter, methods, systems, and media providing personalized notifications to video viewers are provided.

In accordance with some embodiments of the disclosed subject of matter, a method for providing personalized notifications to video viewers is provided, the method comprising: receiving, using a hardware processor, one or more prompts to be presented in association with a video from a user account associated with the video; receiving, from the user account associated with the video, one or more notifications, wherein each of the one or more prompts is associated with one of the one or more notifications; causing the one or more prompts to be presented in association with presentation of the video to a user; receiving an indication that a first prompt of the one or more of the prompts was selected by the user; causing a notification associated with the first prompt to be presented to the user in response to receiving the indication.

In accordance with some embodiments of the disclosed subject of matter, a system for providing personalized notifications to video viewers is provided, the system comprising: a hardware processor that is programmed to: receive one or more prompts to be presented in association with a video from a user account associated with the video; receive, from the user account associated with the video, one or more notifications, wherein each of the one or more prompts is associated with one of the one or more notifications; cause the one or more prompts to be presented in association with presentation of the video to a user; receive an indication that a first prompt of the one or more of the prompts was selected by the user; cause a notification associated with the first prompt to be presented to the user in response to receiving the indication.

In accordance with some embodiments of the disclosed subject of matter, a non-transitory computer-readable medium containing computer-executable instructions that, when executed by a processor, cause the processor to perform a method for providing personalized notifications to video viewers is provided, the method comprising: receiving, using a hardware processor, one or more prompts to be presented in association with a video from a user account associated with the video; receiving, from the user account associated with the video, one or more notifications, wherein each of the one or more prompts is associated with one of the one or more notifications; causing the one or more prompts to be presented in association with presentation of the video to a user; receiving an indication that a first prompt of the one or more of the prompts was selected by the user; causing a notification associated with the first prompt to be presented to the user in response to receiving the indication.

In accordance with some embodiments of the disclosed subject of matter, a system for providing personalized notifications to video viewers is provided, the system comprising: means for receiving one or more prompts to be presented in association with a video from a user account associated with the video; means for receiving, from the user account associated with the video, one or more notifications, wherein each of the one or more prompts is associated with one of the one or more notifications; means for causing the one or more prompts to be presented in association with presentation of the video to a user; means for receiving an indication that a first prompt of the one or more of the prompts was selected by the user; means for causing a notification associated with the first prompt to be presented to the user in response to receiving the indication.

In some embodiments, the one or more notifications include a link to a second video.

In some embodiments, the notification associated with the first prompt is presented to the first user as an email message.

In some embodiments, the one or more prompts are presented as responses to a poll question received from the user account associated with the video.

In some embodiments, the system further comprises: means for retrieving information that indicates a plurality of responses of a plurality of users to the poll, wherein each of the plurality of responses of the plurality of users to the poll includes a user selection of the one or more of the prompts; and means for causing the identified one or more notifications to be presented to the plurality of users.

In some embodiments, the system further comprises: means for receiving a user comment associated with the first prompt; and means for providing a user interface element to the user for identifying one or more other users that have access to view the first prompt and the user comment.

In some embodiments, the system further comprises: means for causing a user interface element to be presented with the one or more prompts; means for receiving a second indication that the user interface element has been selected by the user; and means for inhibiting the notification associated with the first prompt from being presented to the user in response to receiving the second indication.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
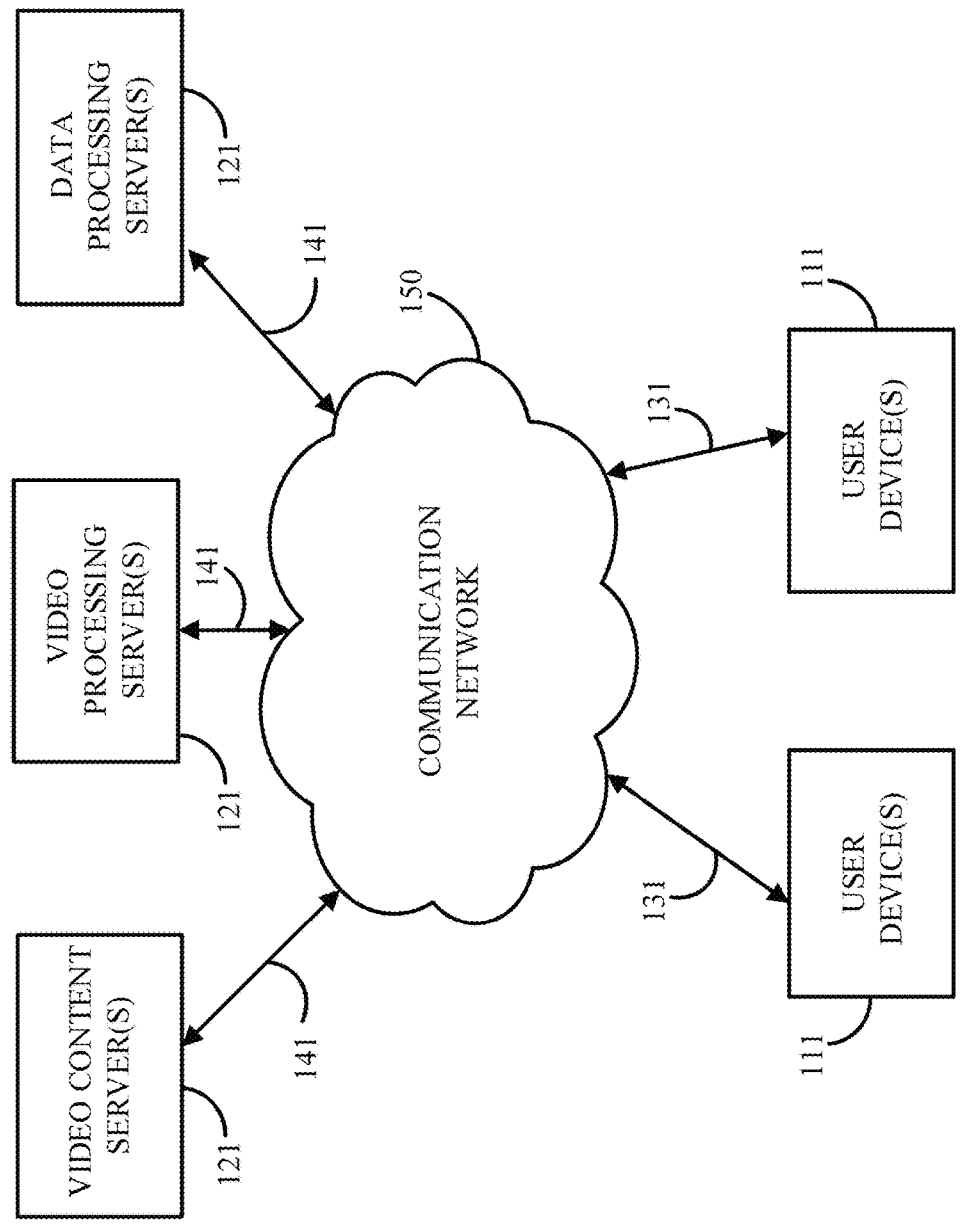
FIG. 1 shows a schematic diagram of a system suitable for implementation of mechanisms described herein for providing personalized notifications to video viewers in accordance with some embodiments of the disclosed subject matter.

In accordance with various embodiments, mechanisms (which can include systems, methods, and computer-readable media) for providing personalized notifications to video viewers are provided.

In some embodiments, the mechanisms described herein can allow a content creator of a video (e.g., a video uploader, a video channel owner, a video program promulgator, etc.) to generate a poll associated with the video. In some embodiments, a poll question and one or more responses can be received from the content creator and can be associated with the video.

In some embodiments, if, after receiving a request for the video from a user, the mechanisms described herein determine that a poll question and one or more responses to the poll are associated with the video, the mechanisms can cause the poll question and the one or more responses to be presented in association with the video. For example, one or more user interface elements that include the poll question and the one or more responses can be presented to the user along with the video as a video annotation. As another example, a floating window that presents the poll question and the one or more responses to the poll can be presented as an overlay annotation after the presentation of the video is finished.

In some embodiments, the mechanisms described herein can prompt the user to interact with the video. For example, the mechanisms can receive a selection of one or more responses to the poll associated with the video. Additionally, the mechanisms can allow a user to add a comment to the selected one or more responses to the poll. In some embodiments, in response to receiving a user selection, the mechanisms can retrieve one or more notifications that correspond to the selected one or more responses to the poll and cause the retrieved one or more notifications to be presented to the user.

In some embodiments, a notification can be a predetermined reply to a user response to the poll and can be set up by the content creator before the user selection is made. Additionally or alternatively, in some embodiments, a content creator can review information related to user responses to the poll and create a notification to be used as a reply to the user response based on the information. In some embodiments, a notification can include any suitable information such as text data, image data, animation data, video data, audio data, a link (e.g., a uniform resource locator (URL)) to a website or other suitable address, a barcode (e.g., a quick response (QR) code) that includes information to direct a user device to an address, etc.

In some embodiments, the mechanisms described herein can analyze information related to user selections of responses to the poll from multiple users of the video and provide a statistical result of the information to the content creator. Based on the statistical result, the mechanisms can allow the content creator to view the range of responses of the multiple users to the video and send respective notifications to different groups of users corresponding to their responses.

Turning to FIG. 1, an example of a generalized schematic diagram of a system 100 on which the mechanisms for providing personalized notifications to video viewers described herein can be implemented is shown in accordance with some embodiments of the disclosed subject matter. As illustrated, in some embodiments, system 100 can include one or more user devices 111, one or more servers 121, a communication network 150, communication links 131 and 141, and/or other suitable components.

In some embodiments, system 100 can include one or more servers 121 (e.g., one or more video content servers, one or more video processing servers, one or more data processing servers, any suitable servers combination, etc.). Server 121 can be any suitable server for providing a copy of and/or access to the mechanisms described herein for providing personalized notifications to video viewers, such as a processor, a computer, a data processing device, or any suitable combination of such devices. For example, one or more items of video content can be stored and delivered using any suitable combination of one or more computer systems, and portions of one or more items of video content may be distributed across multiple servers. As another example, a video content delivery service, and/or a notification providing service can be distributed into multiple backend components and multiple frontend components or interfaces. In a more particular example, backend components, such as video content data collection, processing and/or transmission of video content, etc., can be performed by one or more servers 121. In another more particular example, frontend components, such as presentation of video, presentation of a poll associated with the video, presentation of a notification associated with the poll, etc., can be performed by one or more user devices 111.

User device(s) 111 can be or include any suitable device that is capable of receiving, processing, converting, transmitting, and/or rendering video content and related data, receiving user requests, and/or performing any other suitable functions. For example, user device 111 can be implemented as a mobile device, such as a smartphone, a tablet computer, a laptop computer, a vehicle (e.g., car, boat, airplane, etc.) entertainment system, a portable media player, and/or any other suitable mobile device. As another example, in some embodiments, user device 111 can be implemented as a non-mobile device, such as a desktop computer, a set-top box, a smart television, a multimedia terminal, a streaming media player, a game console, and/or any other suitable non-mobile device. User device(s) 111 can be connected by one or more communication links 131 to a communications network 150 that can be linked via a communication link 141 to a server 121.

In some embodiments, each user device 111 and server 121 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, a storage device (which can include a hard drive, a digital video recorder, a solid state storage device, a removable storage device, or any other suitable storage device), etc.

Communications network 150 can be any suitable computer network or combination of networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communication links 131 and 141 can be any communication links suitable for communicating data between user devices 111 and servers 121, such as network links, dial-up links, wireless links, hard-wired links, any other suitable communication links, or any suitable combination of such links. User devices 111 and servers 121 can be located at any suitable location.

In some embodiments, each server(s) 121 (e.g., video content server(s), video processing server(s), and data processing server(s), etc.) and user device(s) 111 can be implemented as a stand-alone device or integrated with other components of system 100. For example, one or more content servers, one or more video processing servers, and one or more data processing servers can be implemented as one service system in some embodiments. As another example, one or more user devices 111 can be implemented as one user system in some embodiments.

Figure 2:
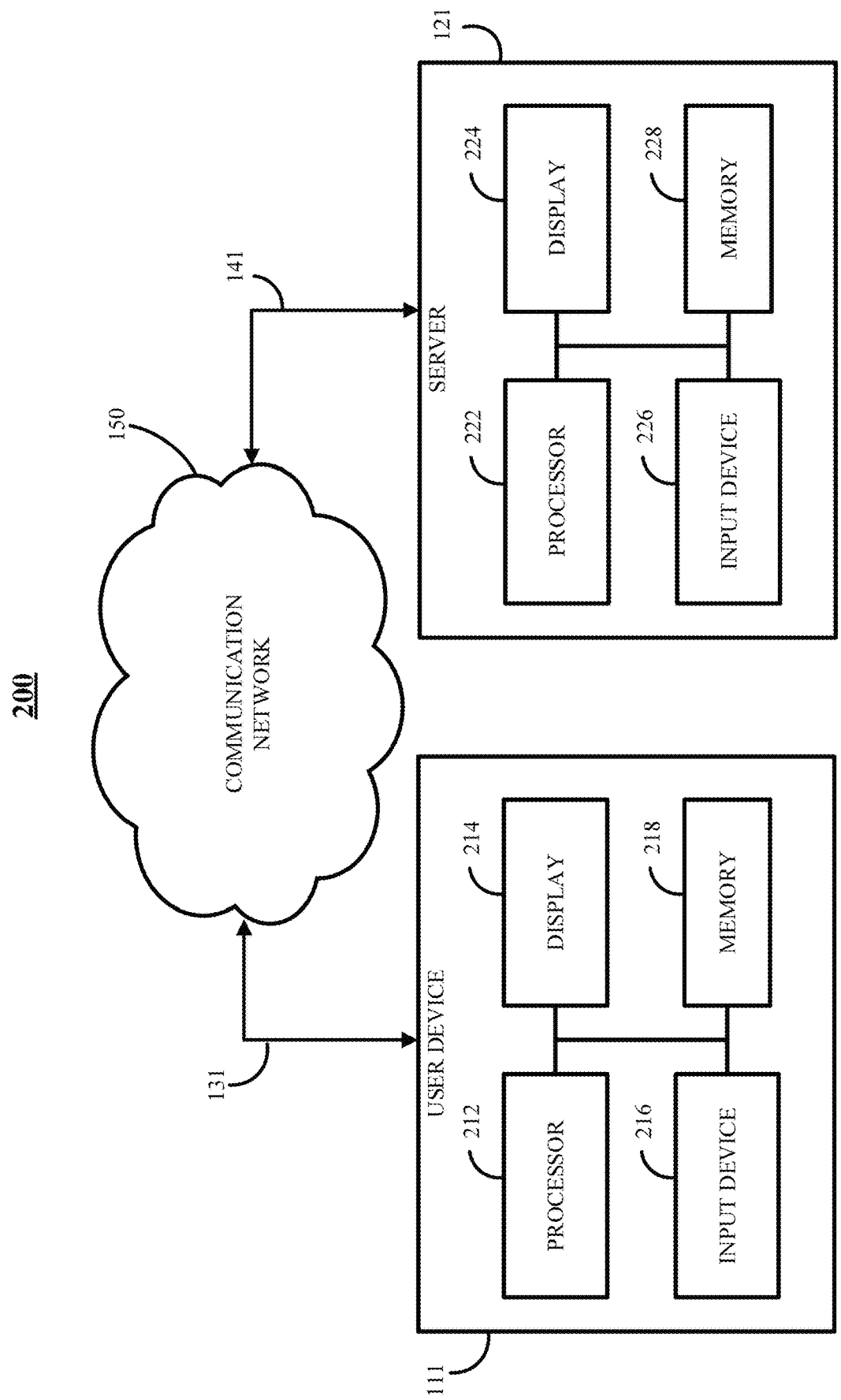
FIG. 2 shows a detailed example of a user device and a server of FIG. 1 that can be used in accordance with some embodiments of the disclosed subject matter.

FIG. 2 illustrates an example 200 of hardware that can be used to implement a user device 111 (e.g., as a mobile phone, a tablet computer, a laptop computer, a desktop computer, a smart television, etc.), and a server 121 (e.g., a video content server, a video processing server, a data processing server, etc.) in accordance with some embodiments of the disclosed subject matter. Referring to FIG. 2, user device 111 can include a hardware processor 212, a display 214, an input device 216, and memory 218, which can be interconnected. In some embodiments, memory 218 can include a storage device (such as a non-transitive computer-readable medium) for storing a computer program for controlling hardware processor 212.

Hardware processor 212 can use the computer program to execute the mechanisms described herein, including: presenting on display 214 a browser window (or any other suitable user interface) that loads a web page that includes instructions for receiving a video and additional information (e.g., as described below in connection with FIG. 3); presenting video content and presenting a poll associated with the video content (e.g., as described below in connection with FIG. 4); detecting a user interaction with the video content and causing a notification to be presented (e.g., as described below in connection with FIG. 5); to send and/or receive data through communications link 131; and/or to perform any other suitable actions. In some embodiments, hardware processor 212 can send and receive data through communications link 131 or any other communication links using, for example, a transmitter, a receiver, a transmitter/receiver, a transceiver, or any other suitable communication device.

In some embodiments, display 214 can include a touchscreen, a flat panel display, a cathode ray tube display, a projector, a speaker or speakers, and/or any other suitable display and/or presentation devices. Input device 216 can include, for example, a computer keyboard, a mouse, a trackball, a key pad, a remote control, a microphone, any other suitable input device, or any suitable combination thereof. Additionally or alternatively, in some embodiments, input device 216 can include a touchscreen of display 214 that can receive input (e.g. using a finger, a stylus, or the like).

Server 121 can include processor 222, display 224, input device 226, and memory 228, which can be interconnected. In some embodiments, memory 228 can include a storage device for storing data received through communications link 141 or through other links, and can also receive commands and/or values transmitted by one or more user devices 111. The storage device can further include a server program for controlling processor 222. In some embodiments, memory 228 can include information stored as a result of user activity (e.g., viewing a video, selecting a response to a poll that associated with the video, etc.). In some embodiments, the server program can cause processor 222 to, for example, execute processes 300, 400, 500 and/or 600 as described below in connection with FIGS. 3-6, respectively.

Processor 222 can use the server program to communicate with user devices 111 as well as provide access to and/or copies of the mechanisms described herein for video content related data (e.g., poll questions, responses to a poll, etc.) collection, processing and/or transmission of video content, processing and/or transmission of information related to notifications in association with video content, sending or receiving any suitable data through communications link 141, and/or performing any other suitable actions. In some embodiments, processor 222 can send and receive data through communications link 141 or any other suitable communication links using, for example, a transmitter, a receiver, a transmitter/receiver, a transceiver, or any other suitable communication device.

In some embodiments, display 224 can include a touchscreen, a flat panel display, a cathode ray tube display, a projector, a speaker or speakers, and/or any other suitable display and/or presentation devices. Input device 226 can include, for example, a computer keyboard, a mouse, a trackball, a key pad, a remote control, a microphone, any other suitable input device, or any suitable combination thereof. Additionally or alternatively, in some embodiments, input device 226 can include a touchscreen of display 224 that can receive input (e.g. using a finger, a stylus, or the like).

Figure 3:
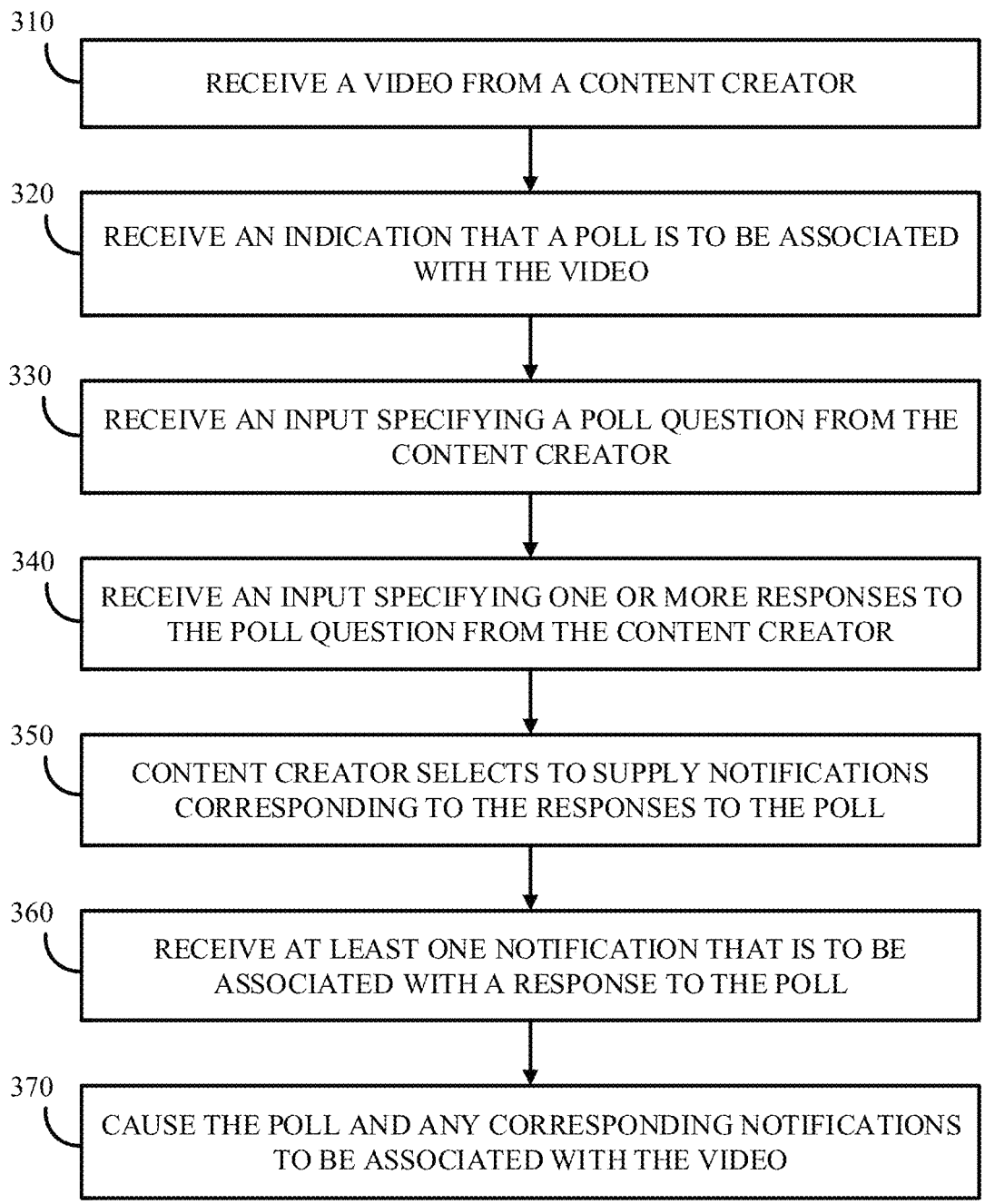
FIG. 3 shows an illustrative example of a process for generating a poll associated with a video in accordance with some embodiments of the disclosed subject matter.

FIG. 3 shows an illustrative example of a process for generating a poll associated with a video in accordance with some embodiments of the disclosed subject matter.

As illustrated in FIG. 3, process 300 can begin, at 310, by receiving a video from a content creator over a network. In some embodiments, the video can include any suitable video content such as a news program, a talk show, a sports program, a music video, user generated video content, one or more clips from a longer video(s), etc. In some embodiments, the video can have any suitable duration (e.g., a few seconds, dozens of minutes, or any other suitable duration). In some embodiments, the video can be encoded using any suitable video codec (e.g., MPEG, WMV, etc.), with any suitable frame rate (e.g., 24 frames per second (FPS), 60 FPS, 72 FPS, etc.), with any suitable resolution (e.g., 720p, 1080p, etc.), and/or with any other suitable characteristic.

In some embodiments, process 300 can receive the video using any suitable technique or combination of techniques. For example, an application (e.g., a browser application, a video content delivery application, a video uploading application, etc.) being executed by user device 111 (e.g., a personal computer, a laptop computer, a tablet computer, a smartphone, a smart television, etc.) can cause a video to be transmitted or uploaded to a remote location (e.g., a video content server, a video processing server, a video sharing platform, a video hosting service, etc.). In some embodiments, a content creator may be requested to log in to such an application prior to being permitted to transmit, upload, and/or edit a video.

Next, at 320, process 300 can receive an indication that a poll is to be associated with the video. In some embodiments, process 300 can receive the indication in any suitable manner and/or using any suitable technique or combination of techniques. For example, process 300 can present a user interface element to the content creator, after a video has been received at 310, for requesting that a poll is to be associated with the video. In such an example, process 300 can receive the indication if an option such that a poll is to be associated with the video has been selected by the content creator using the user interface element. As another example, process 300 can receive the indication automatically if the content creator has previously selected an option such that a poll is to be associated with each video that is received.

At 330, process 300 can receive input specifying a poll question from the content creator. In some embodiments, the poll question can include any suitable content such as text, images, video, audio, etc. In some embodiments, the poll question can include any suitable information specified by the content creator that is unrelated to, directly related to, and/or indirectly related to the video. For example, the poll question can be a survey related to the content of the video. As another example, the poll question can be a survey of a favorite character in the video. As yet another example, the poll question can be a survey related to the length of the video.

At 340, process 300 can receive an input specifying one or more responses to the poll question from the content creator. For example, process 300 can receive a pair of responses such as "Yes" and "No", "Like" and "Dislike", etc. As another example, process 300 can receive multiple responses to a multiple-choice question. In some embodiments, the one or more responses to the poll question can include text, images, video, audio, and/or any other suitable content. In some embodiments, the input received at 340 can include information that specifies a response that allows user to enter text and/or other input as a comment associated with the response.

At 350, process 300 can receive an indication from the content creator that one or more notifications corresponding to the one or more responses are to be supplied. In some embodiments, process 300 can receive the indication in any suitable manner and/or using any suitable technique or combination of techniques. For example, process 300 can present a user interface element, after one or more responses to the poll question has been received at 340, for receiving an indication that one or more notifications corresponding to the one or more responses are to be supplied. In such an example, process 300 can receive the indication if an option such that one or more notifications are to be supplied has been selected by the content creator. As another example, process 300 can receive the indication automatically if the content creator has previously selected an option such that one or more notifications corresponding to the one or more responses are to be supplied when one or more responses to the poll has been received.

At 360, process 300 can receive at least one notification that is to be associated with a response to the poll. In some embodiments, a notification can include any suitable information which can be presented in any suitable form, such as text, images, video, audio, and/or using any other suitable information. For example, a notification can include any suitable information created by the content creator as a reply to the response. As another example, a notification can include any suitable information about the notification, such as a title of the notification, a generation date and/or time, a graphical and/or textual representation of the content creator, etc. As yet another example, a notification can include a link (e.g., a uniform resource locator (URL)), a barcode (e.g., a quick response (QR) code), and/or any other suitable mechanism for directing a user device to a web page and/or an item of media content that may be unrelated to, directly related to, and/or indirectly related to the response.

In some embodiments, process 300 can receive any other suitable information related to a received notification. For example, process 300 can receive instructions to present the received notification. In a more particular example, process 300 can receive instructions to generate a user interface item, such as a web page, that can present the received notification to a user of the video. In another more particular example, process 300 can receive instructions to construct an email that includes the received notification and to send the email to one or more users. In yet another more particular example, process 300 can receive instructions to construct a mobile application notification that can cause the received notification to be presented on a mobile device associated with the user of the video. It should be noted that, in some embodiments, the mechanisms can determine whether the user of the mobile device has provided consent or authorization to send mobile notifications to the user's mobile device.

Next, at 370, process 300 can cause the poll and any corresponding notifications to be associated with the video. In some embodiments, process 300 can cause the poll and any corresponding notifications to be associated with the video in any suitable manner. For example, process 300 can cause the information of the poll and any corresponding notifications to be stored with any suitable identifying information relating to the video, such as a video title, one or more keywords of the video, retrieval data of the video (e.g., an index number), a link to the video, identifying information of a channel (e.g., a channel number) with which the video is associated, and/or any other suitable information that can be used to identify the video.

Figure 4:
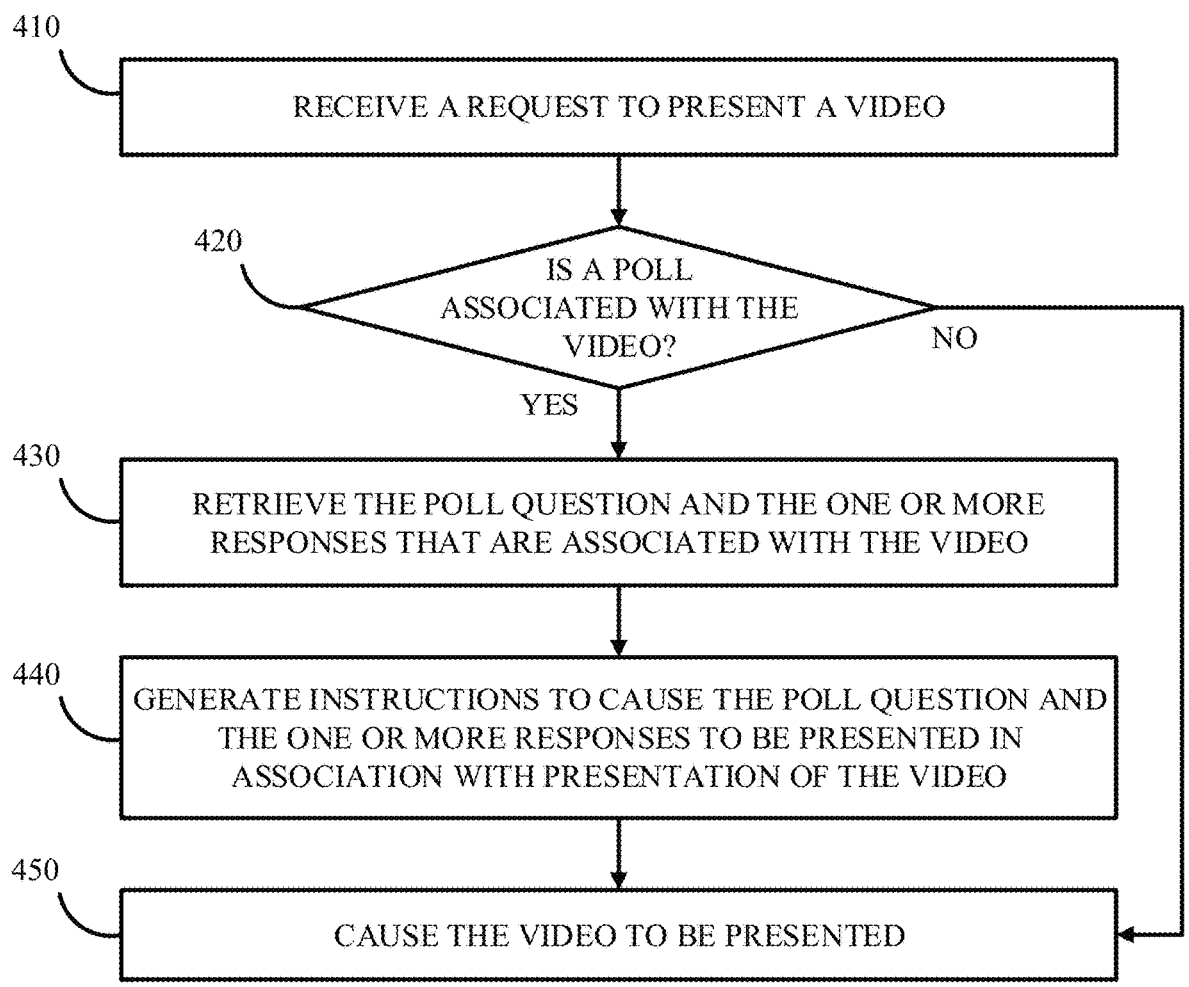
FIG. 4 shows an illustrative example of a process for presenting a poll in association with presentation of a video in accordance with some embodiments of the disclosed subject matter.

FIG. 4 shows an illustrative example of a process for presenting a poll in association with presentation of a video in accordance with some embodiments of the disclosed subject matter.

As illustrated in FIG. 4, process 400 can begin, at 410, by receiving a request to present a video. For example, an application (e.g., a browser application, a media player application, a content delivery application, etc.) being executed by user device 111 (e.g., a personal computer, a laptop computer, a tablet computer, a smartphone, a smart television, etc.) can cause a request for the video to be transmitted to a remote location (e.g., a video content server, video processing server, a video sharing platform, a demand side platform, etc.). As another example, an application being executed by user device 111 can receive a request to present a video that is stored locally by user device 111.

In some embodiments, the request can be associated with identifying information of the video that is to be presented. In some embodiments, the identifying information of a video can include any suitable information to identify the video. For example, the identifying information of a video can include video source information, such as video delivery server address, etc. As another example, the identifying information of a video can include video content information, such as title, keywords, category, and/or any other suitable information that indicates content of the video. As yet another example, the identifying information of a video can include video file information, such as frame sizes, video lengths, Uniform Resource Locator (URL), Internet Protocol (IP) address, and/or any other suitable file information of the video.

At 420, process 400 can determine whether a poll is associated with the video. Process 400 can make this determination in any suitable manner. For example, process 400 can make the determination in response to receiving an indication (e.g., an HTTP message) from a provider of the video (e.g., a video delivery service) that a poll is (or is not) associated with the video. As another example, process 400 can make the determination in response to identifying a flag associated with the video which indicates that a poll is (or is not) associated with the video.

In some embodiments, in response to determining that a poll is not associated with the video ("NO" at 420), process 400 can proceed to 450 and cause the video to be presented. Alternatively, in response to determining that there is a poll associated with the video ("YES" at 420), process 400 can retrieve the poll question and the one or more responses that are associated with the video at 430 (e.g., as described above in connection with 330 and 340 of FIG. 3).

Figure 7:
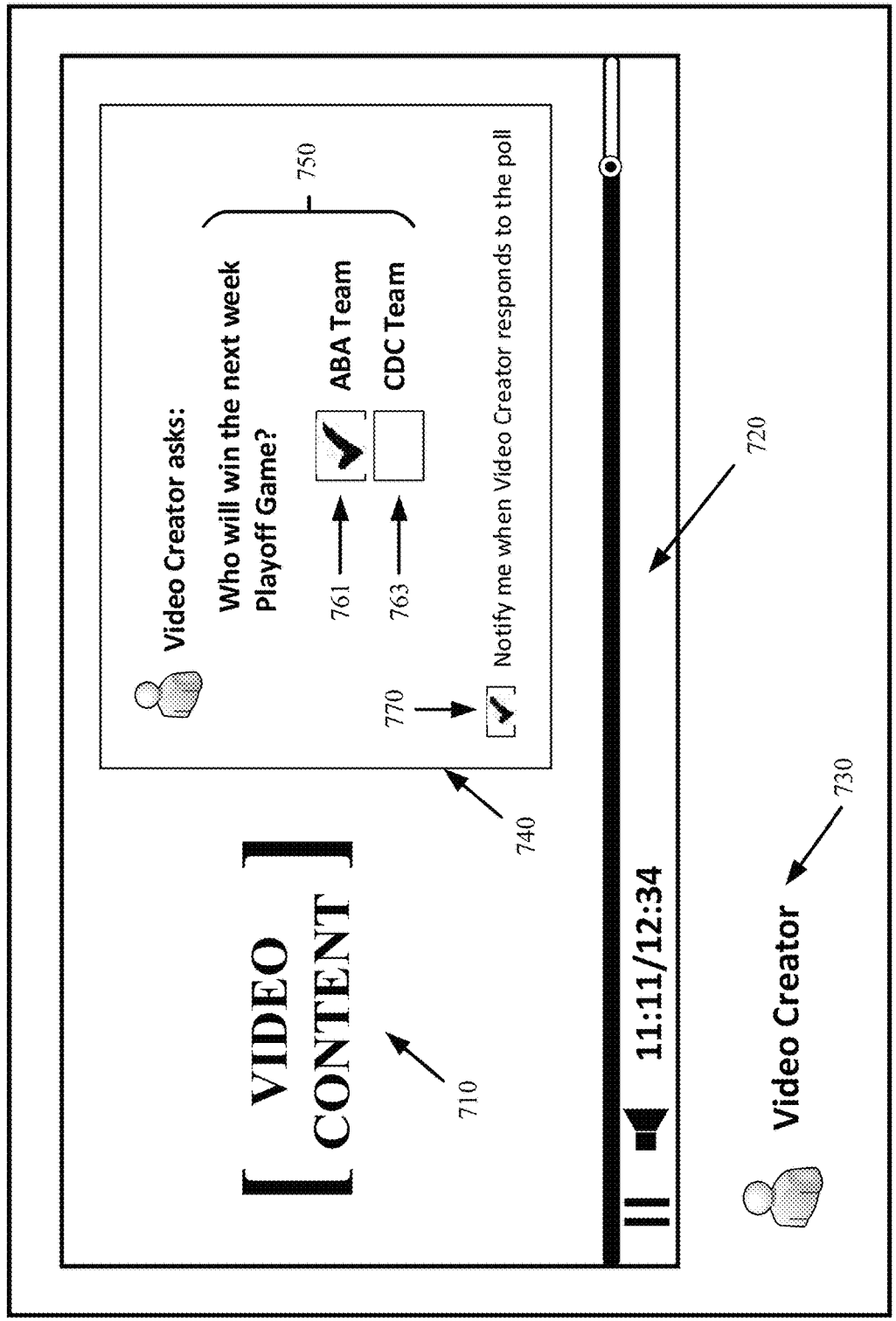
FIG. 7 shows an illustrative example of a user interface for presenting a poll in association with presentation of a video in accordance with some embodiments of the disclosed subject matter.

At 440, process 400 can generate instructions to cause the poll question and the one or more responses to be presented in association with presentation of the video. For example, process 400 can generate any suitable instructions for rendering a user interface item (e.g., message card 740 as shown in FIG. 7) for presenting the poll in association with presentation of the video. In some embodiments, process 400 can generate instructions to render a user interface item including any suitable content, such as text, images, icons, graphics, videos, animations, audio, hypertext, hyperlinks, sounds, etc., for presenting the poll. In some embodiments, process 400 can generate instructions to present the one or more responses to the poll as one or more prompts.

In some embodiments, process 400 can generate instructions related to timing information for presenting the poll. For example, such instructions can include one or more time parameters that can define a start time point, an end time point, a total display time, a display time period, and/or any other suitable parameters of the display time of the user interface item for presenting the poll. In a more particular example, process 400 can generate instructions to cause the user interface item for presenting the poll to be presented before and/or after playback of the video. In another more particular example, process 400 can generate instructions to cause the user interface item for presenting the poll to be presented during playback of the video. In yet another more particular example, process 400 can generate instructions to cause the user interface item for presenting the poll to be displayed as an overlay when playback of the video is paused.

In some embodiments, process 400 can generate instructions related to a location and/or size at which the user interface item for presenting the poll is to be presented. For example, such instructions can include one or more coordinates (e.g., x-coordinates, y-coordinates, and/or z-coordinates) that can define the start positions, end positions, and/or any other suitable parameters of a region in one or more particular dimensions (e.g., x dimension, y dimension, and/or z dimension). As another example, the set of instructions can include one or more coordinates defining the location and/or size of the region with respect to a region in which the video is to be displayed, such as the offsets between the two regions, an overlapping region in which both of the video and the user interface item can be rendered, etc.

In some embodiments, process 400 can generate any suitable instructions that can be used to combine the user interface item presenting the poll and presentation of the video. For example, the instructions can include information relating to colors, a level of transparency, and/or any other suitable parameter that can be used to present the user interface item for presenting the poll (e.g., message card 740 as shown in FIG. 7) in association with the presentation of the video on a user device 111.

In some embodiments, process 400 can generate any suitable instructions that can be used to present selectable elements associated with the user interface item for presenting the poll. For example, process 400 can generate instructions to present a selectable user interface element (e.g., response checkboxes 761 and 763 as shown in FIG. 7) that corresponds to a response to the poll question. As another example, process 400 can generate instructions to allow a user to select a user interface element (e.g., notification checkbox 770 as shown in FIG. 7) that corresponds to a particular function.

At 450, process 400 can cause the video to be presented. In some embodiments, in response to determining that there is not a poll associated with the video ("NO" at 420), process 400 can cause the video to be presented by any suitable device such as a digital video recorder, a smart phone, a tablet computer, a laptop computer, a desktop computer, a television, and/or any other suitable device without causing an associated poll to be presented.

Alternatively, in response to determining that there is a poll associated with the video ("YES" at 420), process 400 can cause the video to be presented in association with the poll question and the one or more responses. In some embodiments, process 400 can use the instructions generated at 440 to cause a user interface item (e.g., message card 740) that presents the poll to be presented with the video. For example, process 400 can cause the user interface item to be presented based on the rendering instructions such as color information, levels of transparency, and/or any other suitable parameters contained in the instructions. As another example, process 400 can cause the user interface item to be overlaid on the video based on positional information contained in the instructions (e.g., coordinates of a region in which the user interface item is to be presented). In some embodiments, process 400 can determine when to present the poll by any suitable technique or combination of techniques, such as by determining user preferences using one or more machine learning techniques, etc.

Figure 5:
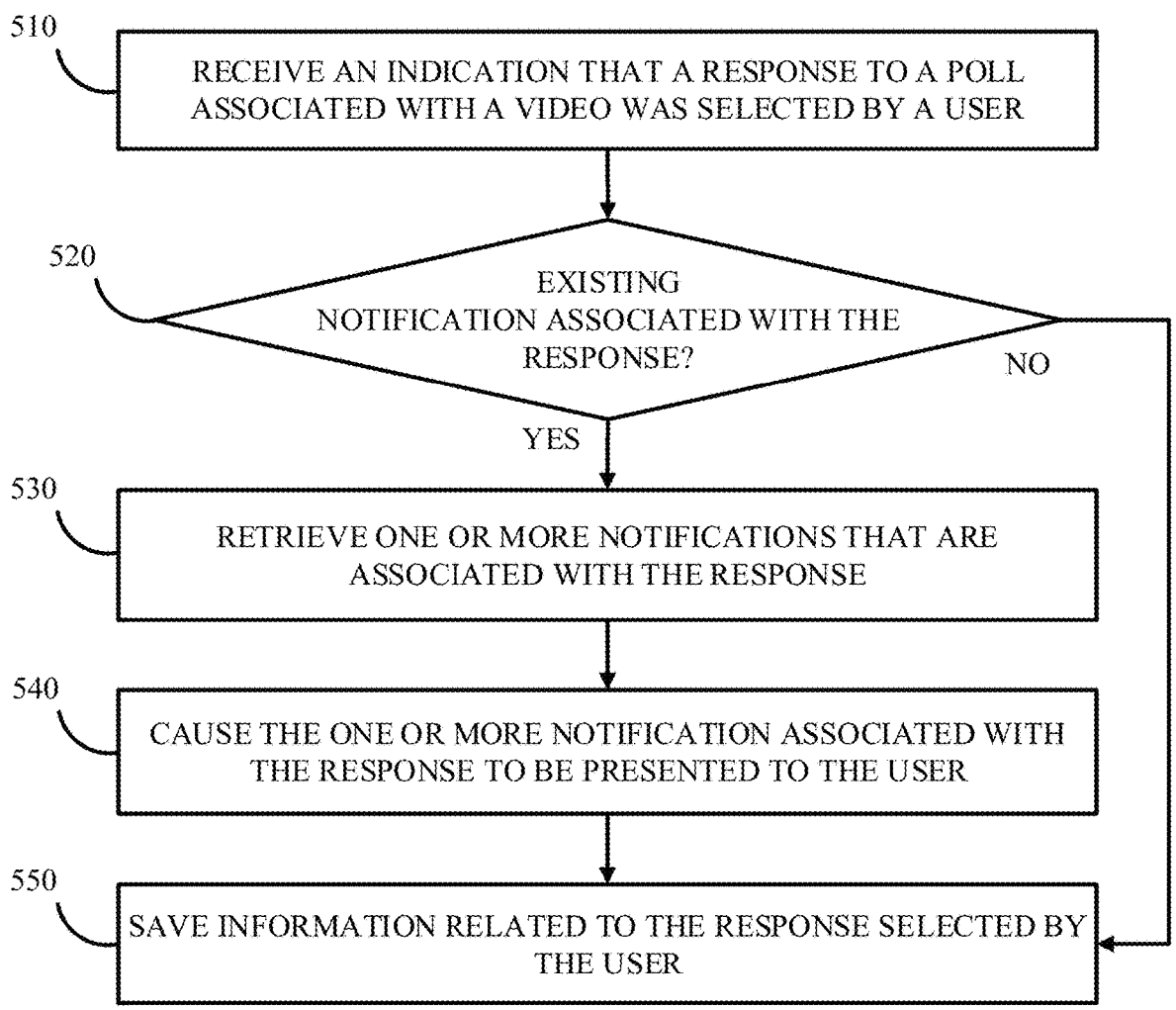
FIG. 5 shows an illustrative example of a process for presenting a notification to a user based on the user's response to a poll in accordance with some embodiments of the disclosed subject matter.

FIG. 5 shows an illustrative example of a process for presenting a notification to a user based on the user's response to a poll in accordance with some embodiments of the disclosed subject matter.

As illustrated in FIG. 5, process 500 can begin, at 510, by receiving an indication that a response (e.g., a particular prompt) to a poll associated with a video was selected by a user. In some embodiments, the indication can be transmitted and received in response to any suitable user input and can be received using any suitable device. For example, the indication can be transmitted and received in response to a user selection of a user interface element that is associated with the response to the poll using an input device, such as an input device 216 as described above in connection with FIG. 2. As another example, the indication can be transmitted and received in response to a voice command detected by an audio input device (e.g., a microphone coupled to user device 111) that indicates a user's desire to select the response to the poll. As yet another example, the indication can be transmitted and received in response to a gesture command detected by a gesture recognition system that indicates a user's desire to select the response to the poll. As still another example, the indication can be transmitted and received in response to receiving a user comment associated with the poll that indicates a user's desire to select the response to the poll.

In some embodiments, the indication can be transmitted and received in any suitable form. For example, the indication can be transmitted and received by one or more infrared signals, WiFi signals, wired connection signals, and/or any other suitable control signals. As another example, the indication can be transmitted and received by an HTTP message from a remote location.

At 520, process 500 can determine whether a pre-existing notification is associated with the response. If process 500 determines that there is not a pre-existing notification associated with the response ("NO" at 520), process 500 can proceed to 550 and can save information related to the response selected by the user for review by the content creator and/or for later notification to the user. Alternatively, if process 500 determines that there is a pre-existing notification associated with the response ("YES" at 520), process 500 can retrieve the one or more notifications that are associated with the response at 530. For example, as described above in connection with FIG. 3, the one or more notifications associated with the response received at 360 can be retrieved using any suitable technique or combination of techniques.

At 540, process 500 can cause the one or more notifications associated with the response to be presented to the user. In some embodiments, process 500 can generate one or more user interface items that include the retrieved one or more notifications and cause the one or more of user interface items to be presented to the user in any suitable manner. For example, process 500 can send the one or more user interface items including the retrieved one or more notifications by email, text message, stream post (e.g., a message within a website, a post associated with a user account of a social network platform, etc.), mobile notification, and/or by any suitable technique or combination of techniques.

In some embodiments, process 500 can cause the one or more notifications associated with the response to be presented to the user at any suitable time after the video is created. For example, process 500 can cause the one or more notifications associated with the response to be presented immediately after receiving the indication at 510 in cases where a pre-existing notification is associated with the response. As another example, process 500 can cause the one or more notifications to be presented to the user after a predetermined delay (e.g., a couple hours, a day, etc.) of receiving the indication at 510. As yet another example, process 500 can cause the one or more notifications associated with the response to be presented to the user in response to receiving an instruction from the content creator.

In some embodiments, before process 500 presenting any notifications to a particular user, process 500 can provide the user an opportunity to control whether a notification is presented and/or how a notification is presented. For example, process 500 can prompt the user to specify one or more sources, such as particular content creators and/or video channels, that are permitted to provide notifications to the user. As another example, process 500 can prompt the user to specify one or more sources that are to be excluded from providing notifications. As yet another example, process 500 can present a user interface element to the user for receiving an indication of whether the user wishes to receive notifications.

At 550, process 500 can save information related to the response selected by the user. For example, identifying information of the user and information specifying one or more responses selected by the user can be saved for review by the content creator and/or for later notification to the user (e.g., as described in connection with process 600 of FIG. 6).

It should be noted that in cases where the mechanisms described herein collect information about a particular user, the user can be provided with an opportunity to control whether the mechanisms collect information about particular users and/or how collected user information is used by the mechanisms. Examples of information about a user can include the user's interests (e.g., based on a video presented to the user, a response to a poll selected by the user, etc.), identifying information of the user, contact information of the user, geographic information of the user, etc. Additionally, certain information about the user can be stored locally by a user device 111 (e.g., not shared), encrypted, and/or treated in one or more ways before it is stored to remove personal information. For example, a user's identity can be treated such that no personal information can be determined for the user. As another example, a user's geographic location can be generalized where location information is obtained (e.g., to a city level, a ZIP code level, a state level, etc.), so that a particular location of a user cannot be determined. Using these techniques and others described herein, the user can have control over what information is collected about the user and/or how that information is used by the application (or other mechanisms).

Figure 6:
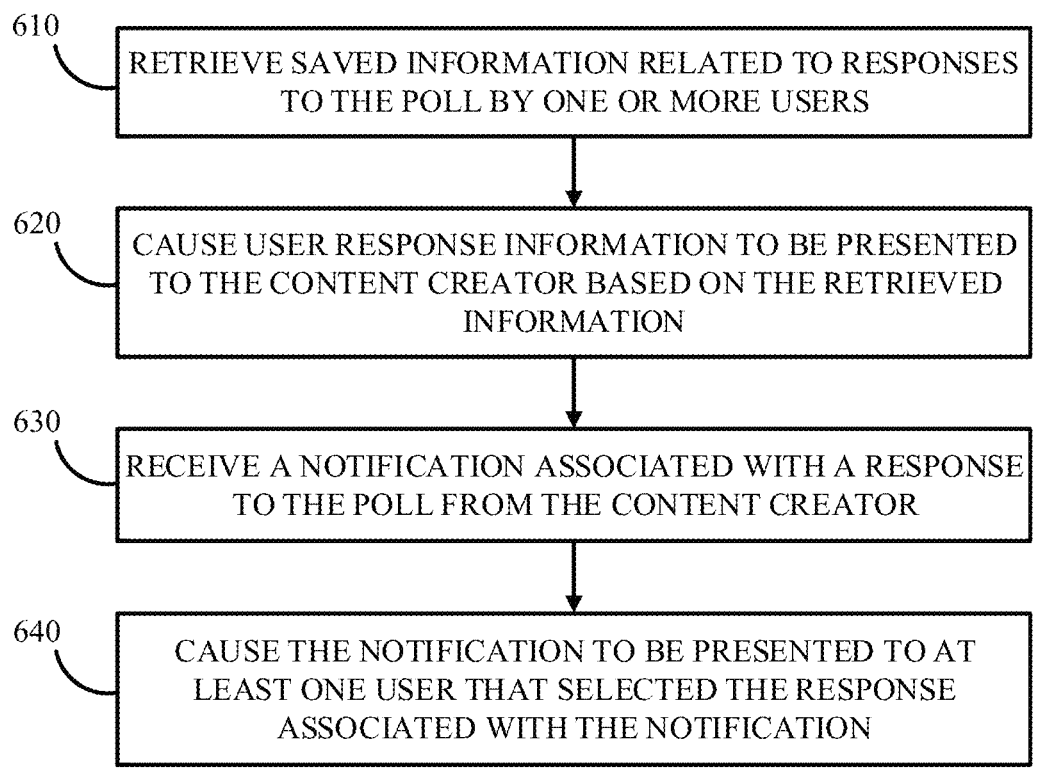
FIG. 6 shows an illustrative example of a process for presenting a notification to multiple users based on the users' responses to a poll in accordance with some embodiments of the disclosed subject matter.

FIG. 6 shows an illustrative example of a process for presenting a notification to multiple users based on the users' responses to a poll in accordance with some embodiments of the disclosed subject matter.

As illustrated in FIG. 6, process 600 can begin, at 610, by retrieving saved information related to responses to the poll by one or more users. In some embodiments, process 600 can execute 610 in response to a predetermined event occurring. For example, process 600 can execute 610 in response to receiving a request from the content creator associated with the video to review information related to user responses (e.g., information save at 550 in FIG. 5). As another example, process 600 can execute 610 in response to receiving an indication that the video has been accessible to users for a predetermined period of time, and/or the video has been viewed and/or requested at least a threshold number of times. As yet another example, process 600 can execute 610 in response to receiving an indication that the number of saved responses to the poll has reached or exceeded a threshold value.

At 620, process 600 can cause user response information to be presented to the content creator based on the retrieved information. In some embodiments, user response information can include any suitable information related to one or more responses to the poll selected by one or more users. For example, user response information can include statistical information of the poll, such as a total number of responses to the poll, distribution of responses to the poll, etc. As another example, user response information can include one or more user comments that are associated with the one or more selected responses to the poll. As yet another example, user response information can include user information (e.g., a username, etc.) of users that publicly shared their selection of response and/or their comments.

At 630, process 600 can receive a notification associated with a response to the poll from the content creator. Such a notification can be similar to the notification as described above in connection with 360 of FIG. 3, and can include any suitable information, such as text, images, video, audio, and/or any other suitable information. In some embodiments, the information included in the notification can be determined by the content creator based at least in part on the user response information presented at 620. For example, the content creator can specify a video according to the user response information and cause the video to be presented as part of a notification associated with a response to the poll. As another example, the content creator can modify an existing notification associated with a response to the poll based on the user response information. As yet another example, the content creator can cause information related to user responses to the poll to be presented as part of a notification associated with a response to the poll.

At 640, process 600 can cause the notification to be presented to at least one user that selected the response associated with the notification. In some embodiments, process 600 can cause the notification to be presented to all users that selected the response associated with the notification. Alternatively, in some embodiments, process 600 can cause the notification to be presented to a portion of the users that selected the response associated with the notification. For example, process 600 can select a small portion (e.g., 1%, 5%, etc.) of the users that selected the response associated with the notification and can cause the notification to be presented to that small portion of the users. In such an example, in response to receiving an indication that the small portion of the users reacted positively to the notification (e.g., a high click through rate (CTR), a low rate of responses indicating that the users do not wish to receive further notifications, a high rate that users watch a video included in the notification to completion, etc.), process 600 can cause the notification to be presented to the remaining portion of the users that selected the response associated with the notification.

In some embodiments, process 600 can cause the notification to be presented to users that have not yet received the notification, and/or users that have not yet viewed the notification. In some embodiments, process 600 can cause the notification to be presented to users that have not yet watched a video linked in the notification. In some embodiments, a user need to be subscribed to a channel associated with the video before the user can receive a notification from the content creator of the channel.

Turning to FIG. 7, an illustrative example of a user interface 700 for presenting a poll in association with presentation of a video is shown in accordance with some embodiments of the disclosed subject matter. In some embodiments, user interface 700 can include video display area 710, control panel 720, video information area 730, message card 740, and/or any other suitable user interface elements.

In some embodiments, video display area 710 can be used to present any suitable video content. In some embodiments, control panel 720 can include multiple user interface elements for performing control functions associated with video playback, such as a play user interface element, a pause user interface element, a stop user interface element, a mute user interface element, volume adjustment user interface element, video progress adjustment user interface element, and any other suitable video control actions. In some embodiments, control panel 720 may contain more, fewer and/or different video control user interface elements than are shown in FIG. 7, or may be omitted (e.g., in a case of voice control).

In some embodiments, video information area 730 can present any suitable information relating to the video presented in video display area 710. For example, video information area 730 can include any suitable user interface elements for presenting a title and/or one or more keywords of the video, a thumbnail image of the video, a link (e.g., a URL) or a barcode (e.g., a QR code) associated with the source of the video, a total number of viewers of the video, etc. As another example, video information area 730 can include any suitable user interface elements for presenting information related to a content creator of the video, such as identifying information (e.g., a username, a graphical representation, etc.) of the content creator, messages from the content creator to viewers of the video, and/or any other suitable information associated with the content creator. As yet another example, video information area 730 can include any suitable user interface elements for presenting user comments associated with the video, information about users associated with the comments, and/or any other suitable information.

In some embodiments, message card 740 can include any suitable user interface elements for presenting the poll question and the one or more responses associated with the video presented using video display area 710. For example, as illustrated in FIG. 7, text 750 representing a poll question and two responses to the poll question are presented using message card 740.

In some embodiments, message card 740 can include any suitable user interface elements for performing additional functions. For example, message card 740 can include one or more user interface elements (e.g., response checkboxes 761 and 763) that corresponds to one or more responses to the poll question, respectively, for selection by a user. As another example, message card 740 can include a user interface element (e.g., notification checkbox 770) for a user to select whether the mechanisms described herein are to send a notification to the user. As yet another example, message card 740 can include a user interface element such as a text box (not shown in FIG. 7) where a user can add a comment to the user's response to the poll. In such an example, message card 740 can include a user interface element (not shown in FIG. 7) such as an access-control-list box to receiving information identifying one or more other users that are to have access to view the users' response and/or comment.

In some embodiments, message card 740 can be presented in any suitable manner. For example, as shown in FIG. 7, message card 740 can be provided as a floating window that is presented in video display area 710. In a more particular example, message card 740 can be provided as a partially transparent user interface overlaid on video display area 710. In another example, message card 740 can be can be provided in a popup window. In yet another example, the video can be presented by a first user device (e.g., a smart television), while message card 740 can be presented by a second user device (e.g., a smartphone).

Although not shown in FIG. 7, in some embodiments, message card 740 can include interactive elements. For example, one or more user interface elements in message card 740 (e.g., response checkboxes 761 and 763, notification checkbox 770, etc.) can be selected by clicking, tapping, or any other suitable mechanism, in some embodiments. As another example, message card 740 can be dismissed by clicking or tapping on a "dismiss" icon (e.g., an "X" at the corner of message card 740 or any other suitable icon), or by swiping or dragging message card 740 at least partially off the border of user interface 700.

As yet another example, one or more user interface elements in message card 740 can be selected to perform any suitable actions. In a more particular example, if a link to a website is presented in message card 740, the link can be selected, and in response, a browser application can be launched to load the website, or a new window or a new tab of the browser application can be opened (e.g., where 700 is presented in a first window or a first tab of the browser application). As another more particular example, if message card 740 presents a thumbnail and/or an animation representing another video, the thumbnail and/or the animation can be selected, and in response, the other video can be presented to the user.

In some embodiments, the application can include client-side software, server-side software, hardware, firmware, or any suitable combination thereof. For example, the application can encompass a computer program that causes one or more processors to execute the content generation application. As another example, the application(s) can encompass a computer program written in a programming language recognizable by user device(s) 111 and/or server(s) 121 that is executing the application(s) (e.g., a program written in a programming language, such as, Java, C, Objective-C, C++, C #, Javascript, Visual Basic, HTML, XML, ColdFusion, any other suitable approaches, or any suitable combination thereof).

In some embodiments, the application can encompass one or more Web-pages or Web-page portions (e.g., via any suitable encoding, such as HyperText Markup Language ("HTML"), Dynamic HyperText Markup Language ("DHTML"), Extensible Markup Language ("XML"), Java-Server Pages ("JSP"), Active Server Pages ("ASP"), Cold Fusion, or any other suitable approaches).

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, and/or any other suitable media), optical media (such as compact discs, digital video discs, Blu-ray discs, and/or any other suitable optical media), semiconductor media (such as flash memory, electrically programmable read only memory (EPROM), electrically erasable programmable read only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be noted that the above steps of the flow diagrams of FIGS. 3-6 can be executed or performed in any suitable order or sequence not limited to the order and sequence shown and described in the figures. Also, some of the above steps of the flow diagrams of FIGS. 3-6 can be executed or performed substantially simultaneously where appropriate or in parallel to reduce latency and processing times. Furthermore, it should be noted that FIGS. 3-6 are provided as examples only. At least some of the steps shown in the figures may be performed in a different order than represented, performed concurrently, or altogether omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, methods, systems, and media for providing personalized notifications to video viewers are provided.

Although the disclosed subject matter has been described and illustrated in the foregoing illustrative embodiments, it is understood that the present disclosure has been made only by way of example, and that numerous changes in the details of embodiments of the disclosed subject matter can be made without departing from the spirit and scope of the disclosed subject matter, which is limited only by the claims that follow. Features of the disclosed embodiments can be combined and rearranged in various ways.

What is claimed is:

1. A method for providing personalized content, the method comprising:
   receiving, at a server, a first video content item from a user device associated with a content creator;
   receiving, at the server from the user device associated with the content creator, a poll that is to be presented in connection with presentation of the first video content item, wherein the poll includes a question and a plurality of responses to the question;
   receiving, at the server from the user device associated with the content creator, a second video content item that is to be associated with a first response of the plurality of responses to the question and a third video content item that is to be associated with a second response of the plurality of responses to the question;
   associating, at the server, the second video content item with the first response of the plurality of responses to the question and the third video content item with the second response of the plurality of responses to the question;
   causing the first video content item to be presented on a first user device associated with a first viewer and on a second user device associated with a second viewer;
   causing the poll to be presented on the first user device and on the second user device in connection with presentation of the first video content item;
   receiving, from the first user device, a response to the poll from the first viewer, wherein the response to the poll from the first viewer corresponds to the first response of the plurality of responses to the question;
   in response to receiving the first response of the plurality of responses to the question from the first user device, causing, by the server, the second video content item to be presented on the first user device;

receiving, from the second user device, a response to the poll from the second viewer, wherein the response to the poll from the second viewer corresponds to the second response of the plurality of responses to the question; and in response to receiving the second response of the plurality of responses to the question from the second user device, causing, by the server, the third video content item to be presented on the second user device.

2. The method of claim 1, wherein receiving the poll comprises receiving, from the user device associated with the content creator, timing information that includes one or more time parameters indicating when the poll is to be presented in connection with presentation of the first video content item, and wherein causing the poll to be presented on the first user device and on the second user device is based on the timing information.

3. The method of claim 1, wherein causing the poll to be presented on the first user device and on the second user device in connection with presentation of the first video content item comprises causing the poll to be presented at a time point at which playback of the first video content item is paused.

4. The method of claim 1, wherein causing the poll to be presented on the first user device and on the second user device in connection with presentation of the first video content item comprises causing the poll to be presented as an overlay on the first video content item.

5. The method of claim 4, wherein causing the poll to be presented as an overlay on the first video content item comprises transmitting instructions to the first user device and to the second user device that indicate a location at which the poll is to be overlaid on the first video content item.

6. The method of claim 1, wherein the response to the poll from the first viewer is received via a remote control associated with the first user device.

7. A system for providing personalized content, the system comprising:
a hardware processor that:
receives a first video content item from a user device associated with a content creator;
receives, from the user device associated with the content creator, a poll that is to be presented in connection with presentation of the first video content item, wherein the poll includes a question and a plurality of responses to the question;
receives, from the user device associated with the content creator, a second video content item that is to be associated with a first response of the plurality of responses to the question and a third video content item that is to be associated with a second response of the plurality of responses to the question;
associates the second video content item with the first response of the plurality of responses to the question and the third video content item with the second response of the plurality of responses to the question;
causes the first video content item to be presented on a first user device associated with a first viewer and on a second user device associated with a second viewer;
causes the poll to be presented on the first user device and on the second user device in connection with presentation of the first video content item;

receives, from the first user device, a response to the poll from the first viewer, wherein the response to the poll from the first viewer corresponds to the first response of the plurality of responses to the question;

in response to receiving the first response of the plurality of responses to the question from the first user device, causes the second video content item to be presented on the first user device;

receives, from the second user device, a response to the poll from the second viewer, wherein the response to the poll from the second viewer corresponds to the second response of the plurality of responses to the question; and in response to receiving the second response of the plurality of responses to the question from the second user device, causes the third video content item to be presented on the second user device.

8. The system of claim 7, wherein receiving the poll comprises receiving, from the user device associated with the content creator, timing information that includes one or more time parameters indicating when the poll is to be presented in connection with presentation of the first video content item, and wherein causing the poll to be presented on the first user device and on the second user device is based on the timing information.

9. The system of claim 7, wherein causing the poll to be presented on the first user device and on the second user device in connection with presentation of the first video content item comprises causing the poll to be presented at a time point at which playback of the first video content item is paused.

10. The system of claim 7, wherein causing the poll to be presented on the first user device and on the second user device in connection with presentation of the first video content item comprises causing the poll to be presented as an overlay on the first video content item.

11. The system of claim 10, wherein causing the poll to be presented as an overlay on the first video content item comprises transmitting instructions to the first user device and to the second user device that indicate a location at which the poll is to be overlaid on the first video content item.

12. The system of claim 7, wherein the response to the poll from the first viewer is received via a remote control associated with the first user device.

13. A non-transitory computer-readable medium containing computer-executable instructions that, when executed by a processor, cause the processor to perform a method for providing personalized content, the method comprising:
receiving a first video content item from a user device associated with a content creator;
receiving, from the user device associated with the content creator, a poll that is to be presented in connection with presentation of the first video content item, wherein the poll includes a question and a plurality of responses to the question;
receiving, from the user device associated with the content creator, a second video content item that is to be associated with a first response of the plurality of responses to the question and a third video content item that is to be associated with a second response of the plurality of responses to the question;
associating the second video content item with the first response of the plurality of responses to the question and the third video content item with the second response of the plurality of responses to the question;

causing the first video content item to be presented on a first user device associated with a first viewer and on a second user device associated with a second viewer;

causing the poll to be presented on the first user device and on the second user device in connection with presentation of the first video content item;

receiving, from the first user device, a response to the poll from the first viewer, wherein the response to the poll from the first viewer corresponds to the first response of the plurality of responses to the question;

in response to receiving the first response of the plurality of responses to the question from the first user device, causing the second video content item to be presented on the first user device;

receiving, from the second user device, a response to the poll from the second viewer, wherein the response to the poll from the second viewer corresponds to the second response of the plurality of responses to the question; and in response to receiving the second response of the plurality of responses to the question from the second user device, causing the third video content item to be presented on the second user device.

14. The non-transitory computer-readable medium of claim 13, wherein receiving the poll comprises receiving, from the user device associated with the content creator, timing information that includes one or more time parameters indicating when the poll is to be presented in connection with presentation of the first video content item, and wherein causing the poll to be presented on the first user device and on the second user device is based on the timing information.

15. The non-transitory computer-readable medium of claim 13, wherein causing the poll to be presented on the first user device and on the second user device in connection with presentation of the first video content item comprises causing the poll to be presented at a time point at which playback of the first video content item is paused.

16. The non-transitory computer-readable medium of claim 13, wherein causing the poll to be presented on the first user device and on the second user device in connection with presentation of the first video content item comprises causing the poll to be presented as an overlay on the first video content item.

17. The non-transitory computer-readable medium of claim 16, wherein causing the poll to be presented as an overlay on the first video content item comprises transmitting instructions to the first user device and to the second user device that indicate a location at which the poll is to be overlaid on the first video content item.

18. The non-transitory computer-readable medium of claim 13, wherein the response to the poll from the first viewer is received via a remote control associated with the first user device.

* * * * *